United States Patent
Niemann et al.

(10) Patent No.: US 9,065,366 B2
(45) Date of Patent: Jun. 23, 2015

(54) METHOD FOR OPERATING AN AT LEAST THREE-PHASE ELECTRIC MACHINE, USED AS A DRIVE ASSEMBLY IN A MOTOR VEHICLE, AND CONTROL UNIT FOR AN INVERTER

(75) Inventors: Holger Niemann, Ludwigsburg (DE); Roland Schleser, Saarbruecken (DE); Daniel Kanth, Ludwigsburg (DE); Andreas Heyl, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 362 days.

(21) Appl. No.: 13/807,467

(22) PCT Filed: May 13, 2011

(86) PCT No.: PCT/EP2011/057772
§ 371 (c)(1),
(2), (4) Date: Mar. 6, 2013

(87) PCT Pub. No.: WO2012/000710
PCT Pub. Date: Jan. 5, 2012

(65) Prior Publication Data
US 2013/0187585 A1    Jul. 25, 2013

(30) Foreign Application Priority Data
Jul. 2, 2010   (DE) .......................... 10 2010 030 856

(51) Int. Cl.
| | |
|---|---|
| *H02P 6/12* | (2006.01) |
| *B60L 3/00* | (2006.01) |
| *H02P 29/02* | (2006.01) |
| *H02M 1/32* | (2007.01) |

(52) U.S. Cl.
CPC . *H02P 6/12* (2013.01); *B60L 3/003* (2013.01); *B60L 2220/14* (2013.01); *B60L 2220/18* (2013.01); *H02M 2001/325* (2013.01); *H02P 29/022* (2013.01); *Y02T 10/7258* (2013.01); *Y02T 10/642* (2013.01)

(58) Field of Classification Search
CPC ....................................................... H02P 6/12
USPC ............................ 318/400.21, 430, 431, 491
See application file for complete search history.

(56) References Cited

U.S. PATENT DOCUMENTS

| | | | |
|---|---|---|---|
| 6,683,435 B1 | 1/2004 | Liang et al. | |
| 7,612,576 B1 * | 11/2009 | Heller et al. | ............. 324/765.01 |
| 8,369,049 B2 * | 2/2013 | Kuehner et al. | .................... 361/3 |
| 8,659,258 B2 * | 2/2014 | Donner et al. | ................. 318/599 |

FOREIGN PATENT DOCUMENTS

| | | |
|---|---|---|
| DE | 10 2006 032446 | 5/2007 |
| DE | 10 2006 003 254 | 7/2007 |
| DE | 10 2008 000 904 | 10/2009 |
| DE | 102010000852 A1 * | 7/2010 |
| JP | 2005 094873 | 4/2005 |
| JP | 2009 071975 | 4/2009 |

OTHER PUBLICATIONS

International Search Report for PCT/EP2011/057772, dated May 7, 2012.

* cited by examiner

*Primary Examiner* — Bentsu Ro
(74) *Attorney, Agent, or Firm* — Kenyon & Kenyon LLP

(57) ABSTRACT

In a method for operating an at least three-phase electric machine used as a drive assembly in a motor vehicle, which is actuated via an inverter, the inverter including switching elements in the form of half bridges which are in each case electrically connected to a respective phase of the electric machine, when a first switching element of a first half bridge connected to a first phase is permanently closed/opened on account of failure, a second switching element of the first half bridge is permanently opened/closed and, in a first angular range of an electrical rotation, which is uninfluenced by the first phase, all switching elements of the additional half bridges are actuated in the usual manner.

9 Claims, 3 Drawing Sheets

METHOD FOR OPERATING AN AT LEAST THREE-PHASE ELECTRIC MACHINE, USED AS A DRIVE ASSEMBLY IN A MOTOR VEHICLE, AND CONTROL UNIT FOR AN INVERTER

BACKGROUND OF THE INVENTION

1. Field of the Invention

The present invention relates to a method for operating an at least three-phase electric machine, used as a drive assembly in a motor vehicle, and a control unit for an inverter.

2. Description of the Related Art

To drive hybrid or electric vehicles, electric machines are used, as a rule, in the form of polyphase machines, which are operated in connection with rectifiers, that are frequently also designated as inverters. The electric machines, in this context, are operated optionally in motor or generator operation. In motor operation, the electric machine generates a driving torque which, when used in a hybrid vehicle, supports an internal combustion engine in an acceleration phase, for example. In generator operation, the electric machine generates electrical energy, which is stored in an energy store, such as a battery or a Super-Cab. The operating type and the power of the electric machine are set using a control unit, frequently designated as machine controller, via the inverter.

Known inverters include a series of switches, with which the individual phases (U,V,W) of the electric machine are optionally switched to a high potential, the so-called intermediate-circuit voltage, or to a low reference potential, particularly ground. The switches are actuated by an external control unit which, as a function of the driver's command (accelerating or braking) calculates a setpoint operating point for the electric machine. The inverter is connected to the control unit and receives from it the appropriate operating data and control commands The operation of the electric machine and the inverter are monitored for safety reasons, and in response to errors, these are restricted or adjusted.

Thus, for instance, a method known from published German patent application document DE 10 2006 003 254 A1, for switching off an electric machine using pulse-controlled inverters in the case of interference, in which undesired side effects during the switching off of the electric machine are minimized and to maximize the regular machine operation, in that the electric machine is first switched to a disconnect operation in which all the switches of the pulse-controlled inverter are open, and subsequently switched to a short-circuit mode, in which the switches connected to high potential are open and the switches connected to the low potential (ground) are closed.

However, in order to maintain the availability of a vehicle even in the error case, it is known for a hybrid vehicle, from published German patent application document DE 10 2008 000 904 A1, that one may ascertain at least one operating parameter value which reproduces an operating parameter of the electric machine, determine an error if at least one of the operating parameter values does not correspond to an operating parameter normal state and to restrict the operation of the electric machine as a driving drive assembly at least partially if a detected error is present. For this, when a detected error is present, the electric machine is operated at least temporarily as a starter, independently from operating the electric machine as a travel drive assembly.

BRIEF SUMMARY OF THE INVENTION

The present invention creates a method for operating an at least three-phase electric machine used as a drive assembly in a motor vehicle, which is actuated via an inverter, particularly a pulse-controlled inverter, the inverter including switching elements in the form of half bridges, and in each case a half bridge being electrically connected to a phase of the electric machine.

If a first switching element of a first half bridge connected to a first phase is permanently closed on account of failure, then, according to the present invention, a second switching element of the half bridge is permanently opened and, in a first angular range of an electrical rotation, which is uninfluenced by the first phase (U), all switching elements (3b, 3c, 3e, 3f) of the additional half bridges (10b, 10c) are actuated in the usual manner.

If, on the other hand, a first switching element of a first half bridge connected to a first phase is permanently open on account of failure, then, according to the present invention, a second switching element of the first half bridge is permanently closed and, in a first angular range of an electrical rotation, which is uninfluenced by the first phase (U), all switching elements (3b, 3c, 3e, 3f) of the additional half bridges (10b, 10c) are actuated in the usual manner.

The present invention is based on the basic idea that an at least three-phase electric machine may continue to be operated in the usual form in a sub-range of an electrical rotation, even upon failure of a half-bridge of the inverter and the failure connected with it of the controllability of the associated phase. In this context, one may use the fact that, in response to each electrical rotation angular ranges occur which are uninfluenced by one of the phases. In this angular range, the switching elements of the additional half-bridges not affected by failure are able to be actuated so that the electric machine is operated in a motor operation, so that a reduced torque comes about, it is true, in comparison to normal operation, which may be utilized, however, to continue driving the motor vehicle as far as the nearest repair shop. In the case of a hybrid vehicle, which also has an internal combustion engine as an additional drive assembly besides the electric machine, the reduced torque may alternatively also be used for starting the internal combustion engine, so that subsequently a purely engine-driven continuation of the trip is made possible. Alternatively to this, the switching elements of the additional half-bridges not affected by failure in the first angular range may also be actuated in such a way that the electric machine is, operated in generator operation, so that, in comparison to normal operation, it is true that reduced energy is yielded, but which is able to be used, for example, to charge an energy store of the motor vehicle, such as a battery, and thus to provide energy for a repeated start as well as additional users, such as light, underpressure pumps for brakes or even servo-steering. The method according to the present invention, using low effort, thus leads to a clear increase in availability for the motor vehicle.

In the method according to the present invention, the fact proves to be particularly advantageous that, because of the continued actuation of the switching elements of the half-bridges not affected by failure, not only is a present rotational motion of the electric machine able to be maintained, but that, while using inertial forces, even starting the electric machine, that is, the transition from a standstill to the rotating state, is made possible. Consequently, the method according to the present invention is able to be used independently of the rotational speed of the electric machine at the time of the failure of a switching element in the inverter.

Four failure scenarios are basically conceivable for the failure of a switching element within a half-bridge of an inverter:

a) A switching element that is able to switch a phase (U, V, W) of the electric machine to a high supply voltage potential (intermediate circuit voltage) (high-side switch) is permanently closed on account of failure.

In this case, the high supply voltage potential is present constantly at the corresponding phase terminal of the electric machine. For a voltage vector diagram of the electric machine, this means that the respective voltage vector takes on permanently the maximum value and with that gets to lie on the circumferential line of the circular diagram. For example, in a three-phase electric machine having three phase windings offset by 120° with respect to its axes, only two of the altogether three angular sectors of a complete electrical rotation are influenced by this voltage vector and, with that, the associated phase. Consequently, there remains an angular range of 120° in which the electric machine, and thus also the inverter, are not influenced by the failure of the switching element is able to continue to be actuated.

In order to avoid a short circuit in the half-bridge affected by the failure, the low-side switch of the respective half-bridge is permanently opened. This is advantageously already taken into account during the circuit design and is supported by the components used for the actuation.

b) A switching element that is able to switch a phase (U, V, W) of the electric machine to a low reference potential (ground) (low-side switch) is permanently closed conditioned on failure.

In this case, the low reference potential is present constantly at the corresponding phase terminal of the electric machine. In this case, too, there remains, however, an angular range of, for instance 120° (see a), in which the electric machine, and thus also the inverter, are not influenced by the failure of the switching element, is able to continue to be actuated in the usual way.

In order to avoid a short circuit in the half-bridge affected by the failure, in this case, the high-side switch of the respective half-bridge is permanently opened. This too is advantageously already taken into account during the circuit design and is supported by the components used for the actuation.

A high-side switch is permanently open on account of failure.

If one assumes that the low-side switch in the respective half is first open, the respective phase terminal is connected directly neither to the high supply voltage potential nor to the low reference potential. There only comes about an indirect connection via the phase windings of the electric machine. The voltage potential at the phase terminal is determined in this case by induction voltages in the phase windings (or perhaps by a voltage applied to the electric machine). Because of the permanent closing of the low-side switch in the half-bridge affected by failure, however, the respective phase terminal of the electric machine may be put at the low reference potential, so that a constellation comes about as is described under b).

A low-side switch is permanently open on account of failure.

If it is assumed that the high-side switch in the respective half-bridge is first of all open, an analogous scenario comes about to the one described under c). Because of the permanent closing of the high-side switch in the half-bridge affected by failure, however, the respective phase terminal of the electric machine may be put at the high supply voltage potential, so that a constellation comes about as is described under a).

In this way, the method according to the present invention is applicable to all conceivable failure scenarios of the switching elements of the half-bridges.

According to one specific embodiment of the present invention, switching elements of the additional half-bridges are opened permanently in the second angular range, so that in this angular range no drag torques or braking torques occur, which would unnecessarily impede the rotational motion of the electric machine.

The present invention also creates a control unit for controlling an inverter, particularly a pulse-controlled inverter, which actuates an at least three-phase electric machine used as a drive assembly in a motor vehicle, the inverter including switching elements in the form of half-bridges, and in each case a half-bridge is connected electrically to a phase of the electric machine. In this context, the control unit is designed so that, at permanent closing of a first switching element, on account of failure, of a first half-bridge connected to a first phase, a second switching element of the first half-bridge is permanently open or, in the case of permanent opening, on account of failure, of the first switching element, the second switching element closes permanently. In both cases, however, the control unit, in a first angular range of an electrical rotation which is uninfluenced by the first phase, controls all the switching elements (3b, 3c, 3e, 3f) of the additional half-bridges (10b, 10c) in the usual manner.

DETAILED DESCRIPTION OF THE INVENTION

Figure 1:
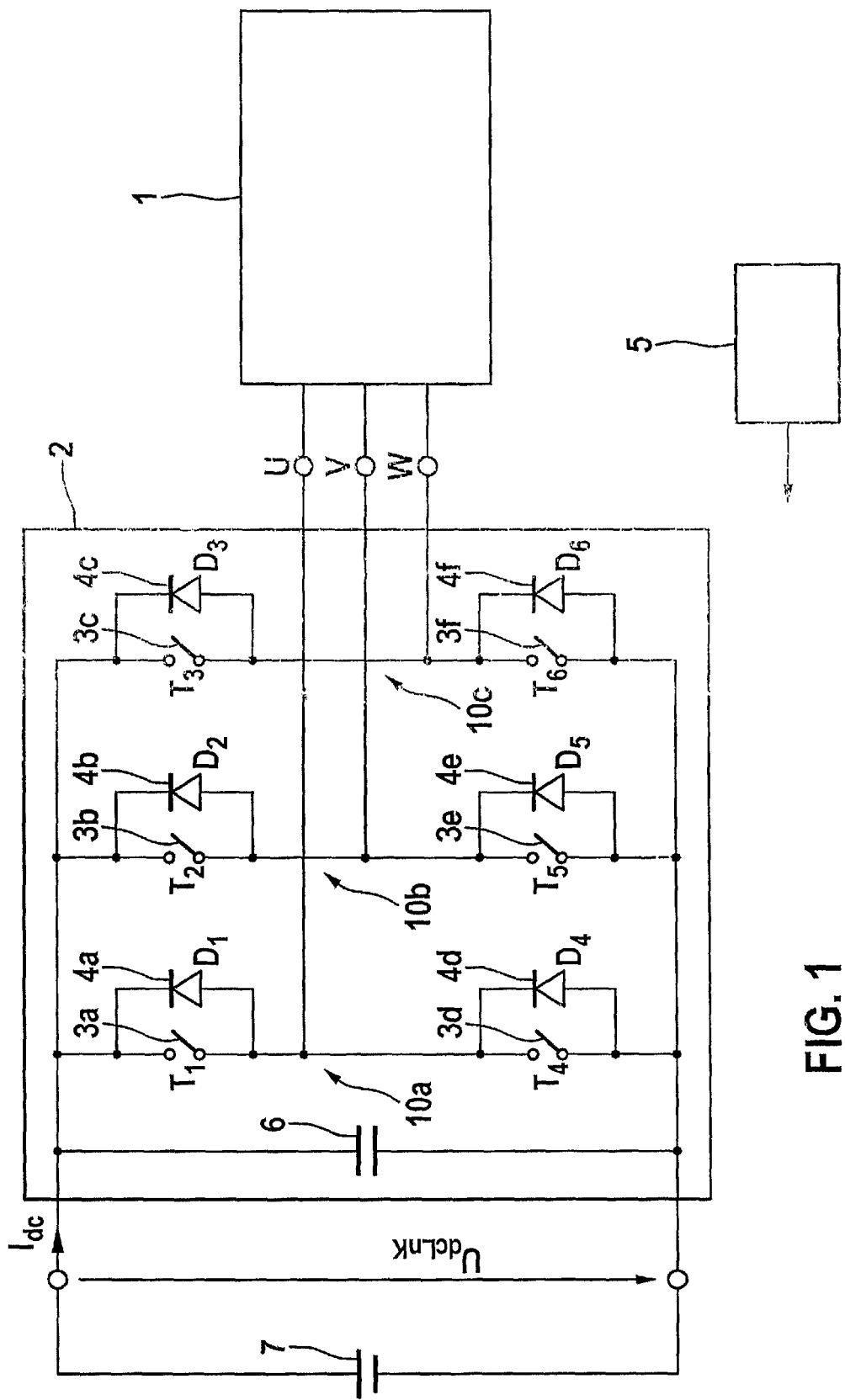
FIG. 1 shows a schematic block diagram of an electric machine as well as an inverter having a control unit according to the present invention.

FIG. 1 shows a schematic representation of a three-phase electric machine 1, which may be designed as a synchronous machine, an asynchronous machine or a reluctance machine, for example, having a pulse-controlled inverter 2 connected to it. Pulse-controlled inverter 2 includes switching elements 3a-3f in the form of power switches, which are connected to individual phases U, V, W of electric machine 1 and switch phases U, V, W either to a high supply voltage potential in the form of an intermediate circuit voltage $U_{dcLnk}$ or a low reference potential in the form of ground. Switching elements 3a-3c connected to intermediate circuit voltage $U_{dcLnk}$ are also designated, in this context, as "high-side switch" and switches 3d-3f connected to ground are also designated as "low-side switch", and may, for instance, be designed as an insulated gate bipolar transistor (IGBT) or as a metal oxide semiconductor field effect transistor (MOSFET). Furthermore, pulse-controlled inverter 2 includes several free-wheeling diodes 4a-4f, which are connected respectively in parallel to one of switches 3a-3f. Switching elements 3a and 3d, 3b and 3e as well as 3c and 3f each form a half-bridge 10a, 10b and 10f, in this case.

Pulse-controlled inverter 2 determines power and type of operation of electric machine 1, and is appropriately actuated by a control unit 5, which in FIG. 1 is shown only schematically, and may also be integrated into inverter 2. Electric machines 1, in this context, may be operated optionally in motor or generator operation.

In addition, pulse-controlled inverter 2 includes a so-called intermediate circuit capacitor 6, which is used essentially to stabilize the voltage of an energy store, that is, a battery voltage, for example. The vehicle electrical system of the vehicle, having an energy store in the form of a battery 7, is connected in parallel to intermediate circuit capacitor 6.

Electric machine 1 is designed to be three-phase in the exemplary embodiment shown, but may also have more than three phases.

Figure 2:
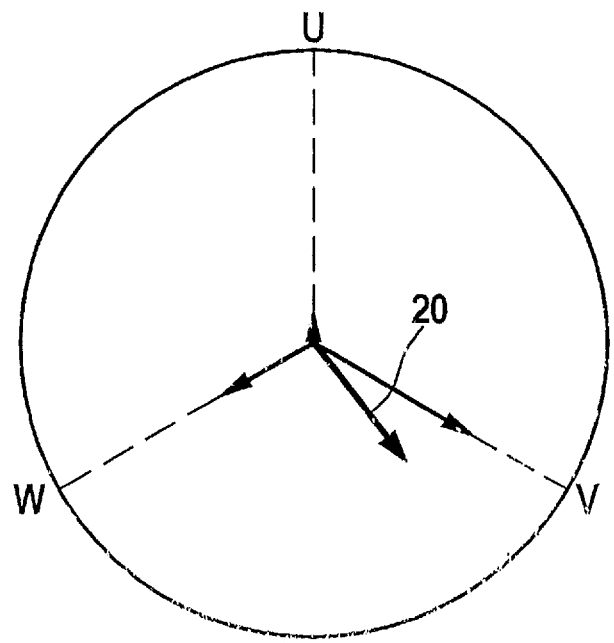
FIG. 2 shows a voltage phasor diagram for an electric machine according to FIG. 1 in the case of intact half-bridges.

In normal operation, in the case of intact switching elements 3a-3f, a voltage vector diagram is yielded, as is shown schematically in FIG. 2. It shows in exemplary fashion a point in time of an electrical rotation, in which phase U of the electric machine makes no contribution to the resulting voltage vector 20, whereas phases V and W each supply a proportion.

Figure 3:
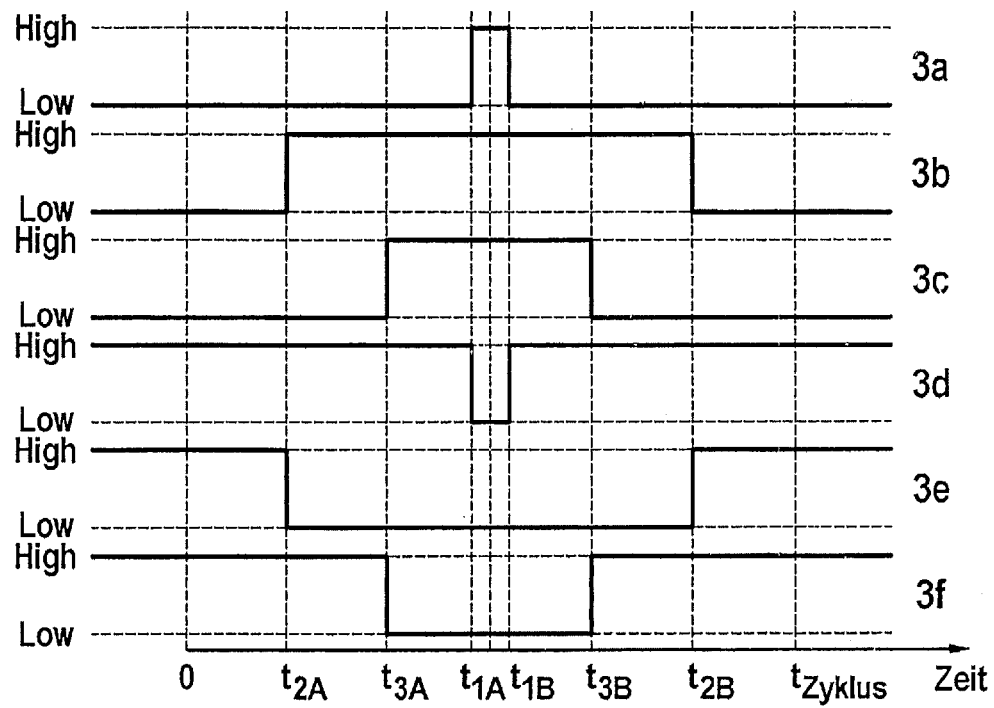
FIG. 3 shows the course of the actuating signals of the individual switching elements of an inverter according to FIG. 1, in the case of intact half-bridges.

The control signals generated by the control unit, in this error-free case, for the individual switching elements 3a-3f of pulse-controlled inverter 2 are shown schematically in FIG. 3 beyond the duration of a control cycle (0 to $t_{cycle}$). Such a customary control of a pulse-controlled inverter 2 is well known to one skilled in the art, and will therefore not be explained in greater detail at this point.

In the following, let us assume a failure of high-side switch 3a, which shows itself in that high-side switch 3a is permanently open on account of the failure (failure scenario c)).

Figure 4:
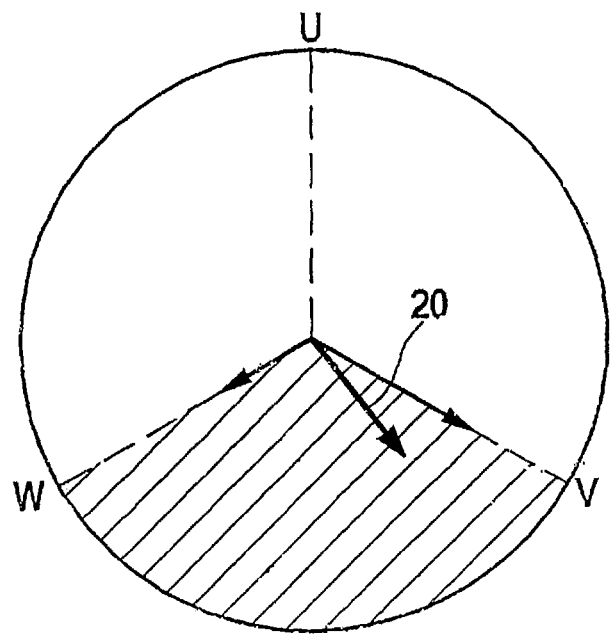
FIG. 4 shows a phasor diagram for an electric machine according to FIG. 1 at failure of a switching element in one of the half-bridges.

The voltage vector diagram resulting from this is shown in FIG. 4. In this context, the identical point in time of an electrical rotation is shown as in FIG. 2. One may see that the failure of switching element 3a at the time shown has no effect on the voltage vector diagram. This is explained in that phase U, that is electrically connected to half-bridge 10a having switching element 3a, makes no contribution, at this moment, to the resulting voltage vector 20. This factual situation applies for the entire angle range of 120° shown hatched in FIG. 4. This angular range, that is not influenced by phase U affected by the failure, is utilized according to the present invention to make possible a continued operation of electric machine 1 in spite of the failure of switching element 3a.

Figure 5:
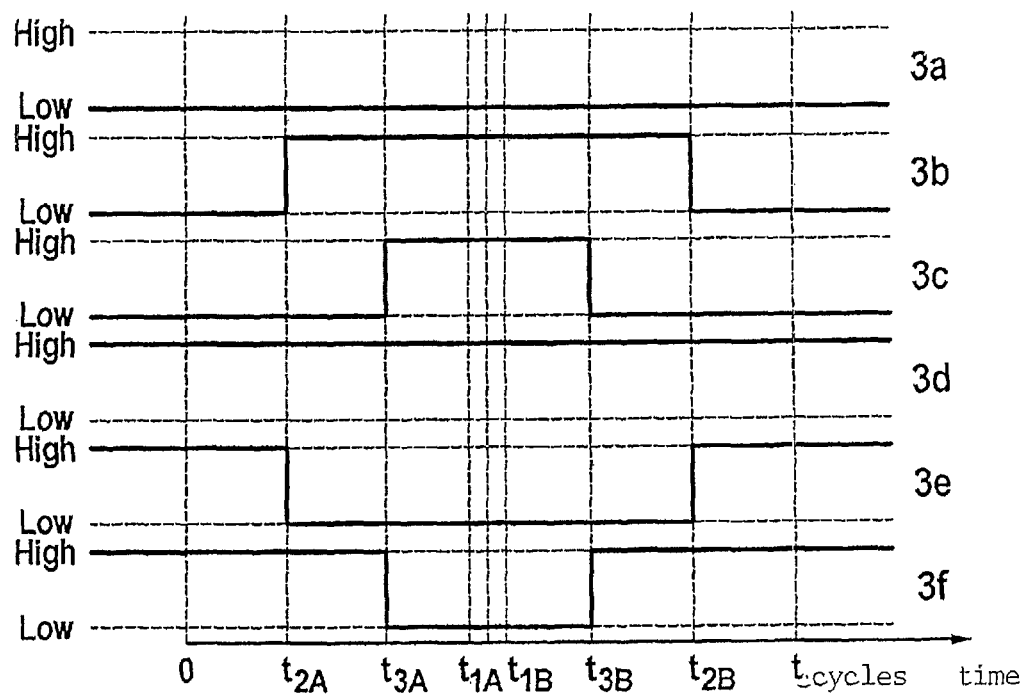
FIG. 5 shows the course of the actuating signals of the individual switching elements of an inverter according to FIG. 1, in the case of failure of a switching element in one of the half-bridges.

This is achieved by the actuating signal, as is shown schematically in FIG. 5. In this context, the actuating signal of switching element 3a is permanently at a low level.

By permanent closing (constant high level) of low-side switch 3d of half-bridge 10a affected by the failure, affected phase U of electric machine 1 is able to be put constantly at the supply voltage potential. The actuating signals for the remaining switching elements 3b, 3c, 3e and 3f of the additional half-bridges 10b and 10c, as shown in FIG. 5, are able to be maintained unchanged, as compared to normal operation (cf. FIG. 3). However, in order to avoid drag torques and braking torques, which would impede the rotational motion of electric machine 1 unnecessarily, it is advantageous to switch switching elements 3b, 3c, 3e and 3f of additional half-bridges 10b and 10c to the second angular range (the area not hatched in FIG. 4), which is influenced by phase U, in a freewheeling mode, in which all these switching elements 3b, 3c, 3e and 3f are permanently open.

In the remaining angular range to be actuated, electric machine 1 may be driven as a motor or even as a generator. However, since in the case of a three-phase electric machine 1 only one angular range of 120°, that is one-third of an electrical rotation is still able to be used for power feeding or withdrawal, the possible motor/generator power is correspondingly reduced to approximately one-third. The reduced torque generated in this manner or the reduced electric energy generated in this manner may, however, be used to continue moving on the motor vehicle or, in the case of a hybrid vehicle to start an internal combustion engine or to charge battery 7.

The present invention was described in exemplary fashion for failure scenario c), in which a high-side switch is permanently open. However, the method according to the present invention is also applicable to the remaining failure scenarios a), b) and d) in an extensively analogous manner. Finally, it is only decisive that, in the half-bridge affected by the failure, the switching element that is still intact is closed or opened permanently in such a way that, at the respective phase terminal of the electric machine, a specified voltage potential (intermediate circuit voltage or ground) sets in.

What is claimed is:

1. A control unit for controlling an inverter which actuates an at least three-phase electric machine used as a drive assembly in a motor vehicle, the inverter including switching elements in the form of half-bridges which are each electrically connected to a respective phase of the electric machine, the control unit comprising:
   means for performing the following in response to the failure of a first switching element of a first half-bridge connected to a first phase:
   (a) one of (i) permanently open a second switching element of the first half-bridge when the first switching element is permanently closed on account of failure, or (ii) permanently close the second switching element when the first switching element is permanently opened on account of failure; and
   (b) in a first angular range of an electrical rotation, which is uninfluenced by the first phase, actuate all switching elements of the remaining half-bridges.

2. A method for operating an at least three-phase electric machine used as a drive assembly in a motor vehicle, comprising:
   actuating, via an inverter, the at least three-phase electric machine, wherein the inverter includes switching elements in the form of half bridges which are each electrically connected to a respective phase of the electric machine;
   wherein, when a first switching element of a first half-bridge connected to a first phase is permanently closed on account of failure, (i) a second switching element of the first half-bridge is permanently opened, and (ii) in a first angular range of an electrical rotation, which is uninfluenced by the first phase, all switching elements of the remaining half-bridges are actuated.

3. The method as recited in claim 2, wherein the switching elements of the remaining half-bridges are permanently opened in a second angular range of an electrical rotation, which is influenced by the first phase.

4. The method as recited in claim 2, wherein the switching elements of the remaining half-bridges are actuated in the first angular range in such a way that the electric machine is operated in a motor operation and a torque generated by the electric machine is used to one of (i) drive the motor vehicle, or (ii) start an internal combustion engine used as an additional drive assembly.

5. The method as recited in claim 2, wherein the switching elements of the remaining half-bridges are actuated in the first angular range in such a way that the electric machine is operated as a generator, and electric energy generated by the electric machine is used to charge an energy store of the motor vehicle.

6. A method for operating an at least three-phase electric machine used as a drive assembly in a motor vehicle, comprising:
- actuating, via an inverter, the at least three-phase electric machine, wherein the inverter includes switching elements in the form of half bridges which are each electrically connected to a respective phase of the electric machine;
- wherein, when a first switching element of a first half-bridge connected to a first phase is permanently open on account of failure, (i) a second switching element of the first half-bridge is permanently closed, and (ii) in a first angular range of an electrical rotation, which is uninfluenced by the first phase, all switching elements of the remaining half-bridges are actuated.

7. The method as recited in claim 6, wherein the switching elements of the remaining half-bridges are permanently opened in a second angular range of an electrical rotation, which is influenced by the first phase.

8. The method as recited in claim 6, wherein the switching elements of the remaining half-bridges are actuated in the first angular range in such a way that the electric machine is operated in a motor operation and a torque generated by the electric machine is used to one of (i) drive the motor vehicle, or (ii) start an internal combustion engine used as an additional drive assembly.

9. The method as recited in claim 6, wherein the switching elements of the remaining half-bridges are actuated in the first angular range in such a way that the electric machine is operated as a generator, and electric energy generated by the electric machine is used to charge an energy store of the motor vehicle.

* * * * *